H. WOLFKILL.
Velocipede.
No. 92,554.
Patented July 13, 1869.
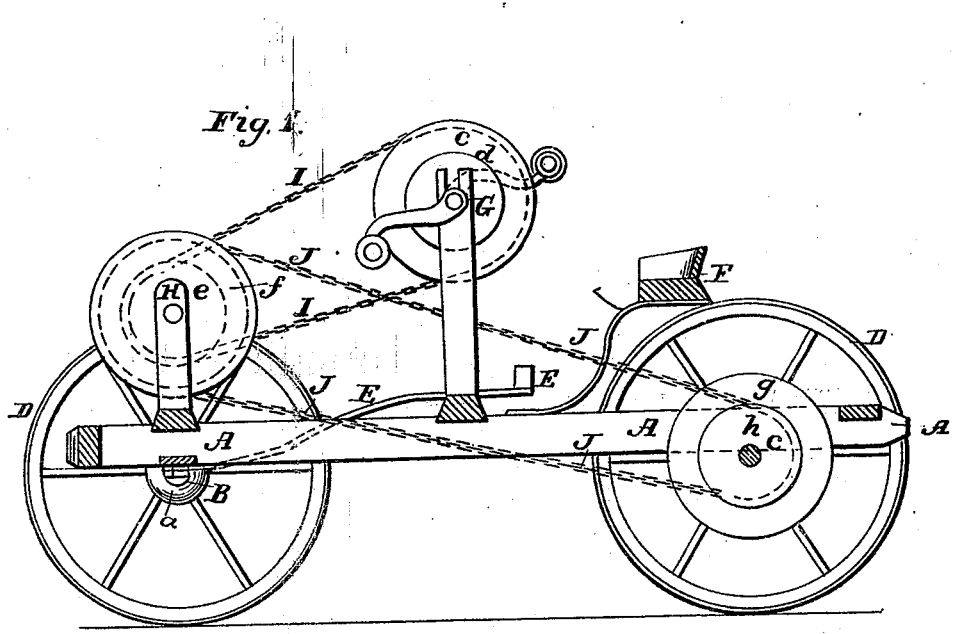
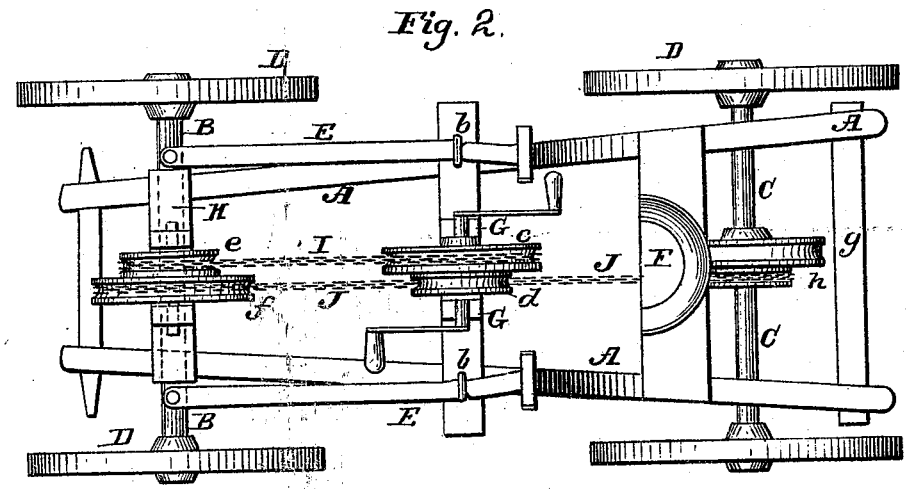

United States Patent Office.

HENRY WOLFKILL, OF MILL CREEK POST OFFICE, PENNSYLVANIA.

Letters Patent No. 92,554, dated July 13, 1869.

IMPROVEMENT IN VELOCIPEDES.

The Schedule referred to in these Letters Patent and making part of the same.

*To all whom it may concern:*

Be it known that I, HENRY WOLFKILL, of Mill Creek Post Office, Brady township, in the county of Huntingdon, and State of Pennsylvania, have invented a new and improved Velocipede; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved velocipede.

Figure 2 is a plan or top view of the same.

Similar letters of reference indicate corresponding parts.

This invention relates to a new mechanism for propelling three and four-wheeled vehicles, and also to certain improvements in the steering-apparatus.

The invention consists chiefly in the application of adjustable chains, which transmit the power to the driving-axle from the crank-axle, with the requisite degree of speed.

The invention also consists in so notching the steering-levers that they are held in place by their guides when not used.

A, in the drawing, represents the frame of my improved vehicle, supported by the front axle B and rear axle C, each carrying a suitable number of wheels D.

The front axle swings on a king-bolt, $a$, and has levers E E extending toward the seat F, which levers fit through staples $b\ b$, fitted upon the frame. The levers E are notched where they pass through the staples, as shown, and are by these notches locked. When to be operated, they must first, by a lateral motion, be released from the staples, and can then be readily moved to steer the device.

G is the propelling-crank shaft, which is to be turned by hand. On it is mounted a double pulley, $c\ d$, one larger than the other. Above the front axle is arranged, on the frame, a shaft, H, carrying also two pulleys $e\ f$, one smaller than the other, while two smaller pulleys $g\ h$ are on the shaft C.

A chain, I, fitted around the pulleys $c\ e$, will transmit motion from G to H, while another longer chain, J, transmits motion from G to C, being fitted around $f$ and $h$.

In this manner the velocity is increased as the chains pass from the larger to the smaller pulleys. But more power, with less velocity, will be gained by shifting the chains or the pulleys, to have them pass from the smaller to the larger. Or the chain J can be entirely dispensed with, and the chain I be carried from the shaft G directly to C. The pulleys may also be reversed on their shafts.

Thus, the power may be regulated at will, and can, in many different ways, be adjusted in accordance with the difficulties to be overcome.

Having thus described my invention,

What I claim as new, and desire to secure by Letters Patent, is—

1. The large and small pulleys $e\ f$, $c\ d$, and $g\ h$, arranged as described, on the shafts H G and axle C, to receive the chains I J, and permit their adjustment, in the manner herein set forth, for the purpose specified.

2. The steering-levers E, pivoted to the front axle B, when notched, as shown, to engage with the guide-shafts $b$, arranged as herein set forth, for the purpose specified.

HENRY WOLFKILL.

Witnesses:
ADAM WARFEL,
JAMES G. CAROTHERS.